US011493901B2

(12) United States Patent
Ouyang et al.

(10) Patent No.: US 11,493,901 B2
(45) Date of Patent: Nov. 8, 2022

(54) DETECTION OF DEFECT IN EDGE DEVICE MANUFACTURING BY ARTIFICIAL INTELLIGENCE

(71) Applicant: International Business Machines Corporation, Armonk, NY (US)

(72) Inventors: Qiqing Christine Ouyang, Yorktown Heights, NY (US); Igor Khapov, Moscow (RU)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 17/031,195

(22) Filed: Sep. 24, 2020

(65) Prior Publication Data

US 2022/0091576 A1  Mar. 24, 2022

(51) Int. Cl.
*G05B 19/406* (2006.01)
*G05B 19/4063* (2006.01)
*G06N 20/00* (2019.01)

(52) U.S. Cl.
CPC ......... *G05B 19/4063* (2013.01); *G06N 20/00* (2019.01); *G05B 2219/31439* (2013.01); *G05B 2219/32222* (2013.01)

(58) Field of Classification Search
CPC ...... G05B 19/4063; G05B 2219/31439; G05B 2219/32222
USPC ....................................................... 700/110
See application file for complete search history.

(56) References Cited

U.S. PATENT DOCUMENTS

| 6,522,939 | B1 | 2/2003 | Strauch |
| 6,618,682 | B2 | 9/2003 | Bulaga |
| 6,968,312 | B1 | 11/2005 | Jordan |
| 7,032,816 | B2 * | 4/2006 | Markham ............. G06Q 50/00 235/375 |
| 7,209,846 | B2 | 4/2007 | Tamaki |
| 8,065,251 | B2 | 11/2011 | Mehta |
| 2006/0047454 | A1 | 3/2006 | Tamaki |
| 2015/0106058 | A1 * | 4/2015 | Mazzaro ............ G01M 99/005 702/181 |
| 2019/0164270 | A1 * | 5/2019 | Wardell ................ G06N 20/00 |
| 2021/0011177 | A1 * | 1/2021 | Adler ................... G01N 23/043 |
| 2021/0383530 | A1 * | 12/2021 | Peleg .................... G06N 3/084 |
| 2022/0128983 | A1 * | 4/2022 | Zhang ................... G06K 9/623 |

FOREIGN PATENT DOCUMENTS

| CN | 109034483 A | 12/2018 |
| CN | 113591948 A * | 11/2021 |
| EP | 0686900 B1 | 5/2001 |

(Continued)

*Primary Examiner* — Hien D Khuu

(74) *Attorney, Agent, or Firm* — Monchai Chuaychoo

(57) ABSTRACT

An approach alerting users based on a detected defect during manufacturing quality inspection based on graphical images is disclosed. The approach initiates a device inspection, wherein a model controller collects metadata about a product to be inspected and select a first model with a highest score to identify defects in the device. The approach utilizes an API to obtain results from the inspection and after determining that another model is available, initiating the second model run via an edge device performing the inspection of the device. And the algorithm awaits a response in detecting a defect during either the first model run or the second model run, providing an alert detailing the defect detected in the device.

17 Claims, 5 Drawing Sheets

(56) References Cited

FOREIGN PATENT DOCUMENTS

| WO | 2010069746 A2 | 6/2010 | | |
|----|---|---|---|---|
| WO | WO-2012037650 A1 * | 3/2012 | ....... | G06Q 10/06395 |
| WO | 2019028269 A2 | 2/2019 | | |
| WO | WO-2019176990 A1 * | 9/2019 | | |
| WO | WO-2022065621 A1 * | 3/2022 | ....... | G06Q 10/06395 |

* cited by examiner

DETECTION OF DEFECT IN EDGE DEVICE MANUFACTURING BY ARTIFICIAL INTELLIGENCE

BACKGROUND

The present invention relates generally to manufacturing, and more particularly to a automatically prioritizing models for quality inspection by the use of AI (Artificial Intelligence).

Edge computing is a distributed computing topology that brings i) data storage and ii) computation closer to the location where it is needed. Thus, edge computing can improve response times and save bandwidth in an environment. Using edge computing with AI, it is a way to distribute AI and get result in real-time. Simulating and running models requires a lot of compute resources, thus, EDGE computing has an advantage over other computing system with regards to AI.

Quality inspection (i.e., computer vision system) in a manufacturing environment requires inferencing/running multiple models to check all attributes of the products and get a more accurate readout. Edge computing has been used in quality inspection and proves to be valuable in delivering results of defect analysis.

SUMMARY

Aspects of the present invention disclose a computer-implemented method, a computer system and computer program product for training a machine learning model to detect quality inspections based on graphical images. The computer implemented method may be implemented by one or more computer processors and may include, selecting a defect identification model based on a defect prioritizing algorithm; inspecting a production operation based on the defect identification model; recording an identity of a defective product in the production operation; and outputting the identity of the defective product.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
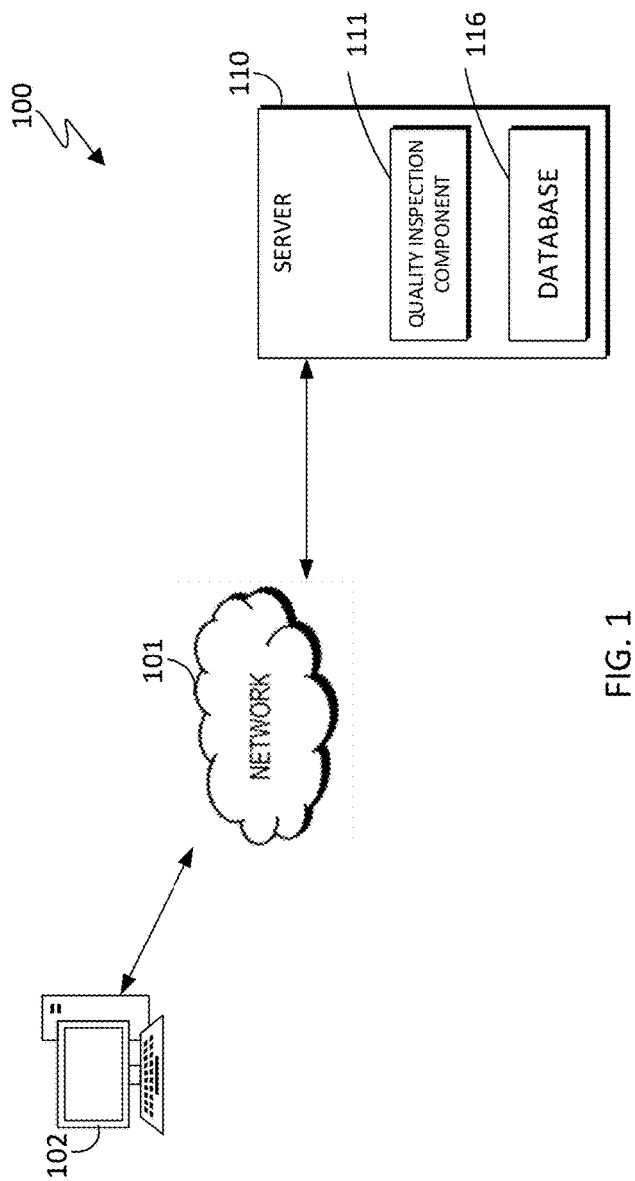
FIG. 1 is a functional block diagram illustrating a high level overview of the quality inspection and the equivalent graphics representation in accordance with an embodiment of the present invention.

Embodiments of the present invention provides an approach for prioritizing inferencing models (i.e., defect detection model) on edge devices during manufacturing using AI (artificial intelligence) and edge services. The approach utilizes, an i) algorithm for prioritizing the models for deployment with an integrated solution for distributed AI with scalability and ii) a centralized system control. The summary of the approach can include the following general steps: a) initiating a device inspection, wherein a model controller collects metadata about a product to be inspected and select a first model with a highest score to identify defects in the device and b) the model controller initiating the model run via an edge device performing the inspection of the device. The approach utilizes an API to obtain results from the inspection and after determining that another model is available, initiating the second model run via an edge device performing the inspection of the device. And the algorithm awaits a response in detecting a defect during either the first model run or the second model run, providing an alert detailing the defect detected in the device. The algorithm for prioritization for inferencing models (i.e., defect detection of products) on edge devices (i.e., camera, automated manufacturing devices) is a unique method of assigning scores to the models related to a certain type of products.

Other embodiments of the present invention may recognize one or more of the following facts, potential problems, potential scenarios, and/or potential areas for improvement with respect to the current state of the art: i) save time and computer resources for inspection. For example, if it is non-repairable defect then the item will be scrapped (other model will not be started) or if it can be repaired then the manufacturing team will react on defects faster and can prevent future failure, ii) save time by reducing the switching between models (i.e., cold starts) and iii) a centralized model management in distributed edge cluster (manufacturing sites) to prevent human error.

In other embodiments, the approach can be described as a distributed AI quality inspection system. Distributed in this context means that the approach can manage multiple devices and manage multiple models across all edge devices. Edge service provides flexibility to deploy models and updates versions remotely based on inspected product type.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a quality inspection environment in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Quality inspection environment includes network 101, client computing device 102 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, client computing device 102 and other computing devices (not shown) within quality inspection environment. It is noted that other computing devices can include, but is not limited to, client computing device 102 and any electromechanical devices capable of carrying out a series of computing instructions.

Server 110 and client computing device 102 can be a standalone computing device, a management server, a web server, a mobile computing device, or any other electronic device or computing system capable of receiving, sending, and processing data. In other embodiments, server 110 and client computing device 102 can represent a server computing system utilizing multiple computers as a server system, such as in a cloud computing environment. In another embodiment, server 110 and client computing device 102 can be a laptop computer, a tablet computer, a netbook computer, a personal computer (PC), a desktop computer, a personal digital assistant (PDA), a smart phone, or any other programmable electronic device capable of communicating other computing devices (not shown) within quality inspection environment 100 via network 101. In another embodiment, server 110 and client computing device 102 represents a computing system utilizing clustered computers and components (e.g., database server computers, application server computers, etc.) that act as a single pool of seamless resources when accessed within quality inspection environment.

Client computing device 102 can be a computing device with the capability of managing and controlling manufacturing devices (e.g., production machines, devices that support production machines, etc.). Client computing device 102 can include inspection devices such as cameras, lasers scanner and any devices that can inspect (e.g., visually, sonic, etc.) of products associated within a manufacturing production line.

Embodiment of the present invention can reside on server 110 or on client computing device 102. Server 110 includes quality inspection component 111 and database 116.

Quality inspection component 111 provides the capability of automatically prioritizing a model list for capturing a faulty product faster and reducing the time spent for product inspection. Model prioritization will be based on historical data about the products with the same type, produced on the same manufacturing line.

Database 116 is a repository for data used by quality inspection component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within quality inspection environment, provided that quality inspection component 111 has access to database 116. Database 116 may store information associated with, but is not limited to, defective data of all products, non-defective data for all products, data related to raw materials used, data related to manufacturing machines including maintenance logs, sensor data (real-time and/or historical), profile of model engineer, all product inference models and edge server and/or device information.

Figure 2:
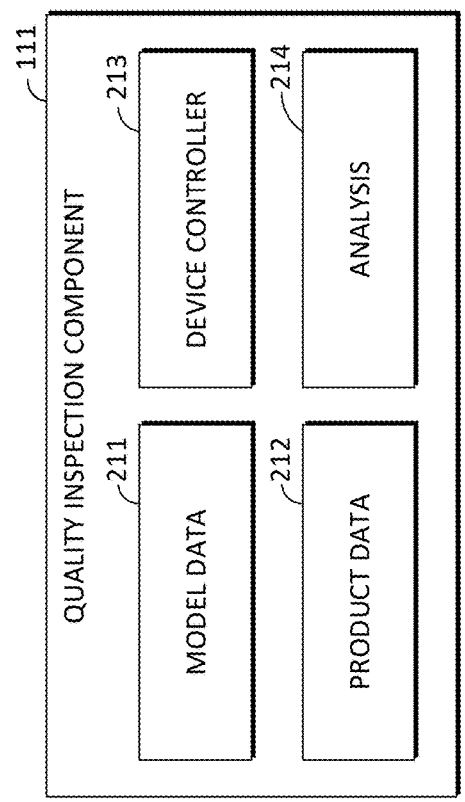
FIG. 2 is a functional block diagram illustrating the subcomponents of quality inspection component 111, in accordance with an embodiment of the present invention.

FIG. 2 is a functional block diagram illustrating quality inspection component 111 in accordance with an embodiment of the present invention. In the depicted embodiment, quality inspection component 111 includes model data component 211, product data component 212, device controller component 213 and analysis component 214.

As is further described herein below, model data component 211 of the present invention provides the capability of creating, ranking, storing and updating models associated with products from a manufacturing line. Models are used by the machine vision system (i.e., can reside on edge device). Machine/computer vision system is a system that can be used for supporting a manufacturing process. A machine system relies on object/vision detection and can identify defects on a production line. It can be used for quality control where details or final products are being automatically inspected in order to find defects.

There can be multiple models associated with each defect per product item. For example, product_A can have four areas that a computer vision system check for defects: product_A_point1, product_A_point2, product_A_point3 and product_A_point4. Each point of product-A, for example, product_A_point1, could have multiple defective detection models: product_A_point1_defectModel_1, product_A_point1_defectModel_2 and product_A_point1_defectModel_3. Similarly, there can be multiple models for product_A_point1 through point 4. Thus, ranking the models and assigning a score to each model is based on the following equation:

$$\text{score} = \frac{\sum_{i=1}^{n} d_{tlb}}{n_{tlb}} * a + \left( \frac{\sum_{i=1}^{n} d_{tl}}{n_{tl}} + \frac{\sum_{i=1}^{n} d_{lb}}{n_{lb}} + \frac{\sum_{i=1}^{n} d_{tb}}{n_{tb}} \right) * b + \left( \frac{\sum_{i=1}^{n} d_{t}}{n_{t}} + \frac{\sum_{i=1}^{n} d_{l}}{n_{l}} + \frac{\sum_{i=1}^{n} d_{b}}{n_{b}} \right) * c,$$

where $d_{tlb}$—number of defects in products with the same type, same line and same batch, $n_{tlb}$—number of inspected products with the same type, same line and same batch, $d_{tl}$—number of defects in products with the same type and same line, $n_{tl}$—number of inspected products with the same type and same line, $d_{lb}$—number of defects in products with the same line and same batch, $n_{lb}$—number of inspected products with the same line and same batch, $d_{tb}$—number of defects in products with the same type and same batch, $n_{tb}$—number of inspected products with the same type and same batch, $d_t$—number of defects in products with the same type, $n_t$—number of inspected products with the same type, $d_l$—number of defects in products with the same line, $n_l$—number of inspected products with the same line, $d_b$—number of defects in products with the same batch, $n_b$—number of inspected products with the same batch, a, b, c—correlation coefficient where a>b>c. See Table 1 for an example of a scores for a product.

The whole scoring calculation is done outside edge device (on an edge server) and works with the edge service to deliver the correct model for quality inspection. Any servers can be used to run the calculation/algorithm. However, it is recommended (i.e., best method) to use edge service since it provides a centralized management across all edge devices.

As is further described herein below, product data component 212 of the present invention provides the capability of interfacing to a corpus of knowledge of data related to products in the production run and data related to the area where edge device are placed. For example, the data can include historical information such as, model number, weight, manufacturing date, raw materials used, machine used etc. It is noted that product data can also include real time data of the product associated with the current production run.

As is further described herein below, device controller component 213 of the present invention provides the capability of communicating and controlling a computer vision system. For example, device controller component 213 can instruct a computer vision system to begin inspecting product for defects based on the selected model. Device controller component 213 can also receive defect data related to the inspection of the product from the computer vision system.

As is further described herein below, analysis component 214 of the present invention provides the capability of, i) selecting the appropriate model from model data component 211, ii) initiate the quality inspection process through device controller component 213 and iii) determining corrective action if any related to the quality inspection report associated with the product. Analysis component 314 can select the highest scoring model to run based on the score of each model related to the product (see Table 1). For example, analysis component 214 can select defectModel_2 as the "best" model for point1 belonging to product_A. Similarly, analysis component 214 can pick defectModel_3 for point2 and defectModel_3 for point3.

TABLE 1

| | defectModel_1 | defectModel_2 | defectModel_3 |
|---|---|---|---|
| Product_A_point1 | 50 | 80 | 70 |
| Product_A_point2 | 75 | 78 | 98 |
| Product_A_point3 | 20 | 15 | 60 |

Analysis component 314 can assign a defect ID (identification) number to a product that does not meet a defective threshold. For example, if the defective threshold (for the entire product) is set to 60 (i.e., range from 0 to 100, where 100 is the highest score), productA's defective score for each three areas are 50, 75 and 75, respectively analysis component 214 can deem the entire product as defective (even though the other two areas passed). Or similarly, a defective threshold can be used for various areas of that particular product (e.g., defective_threshold_area1=50, defective_threshold_area2=60 and defective_threshold_area3=75, etc.) instead for the entire product where productA would not fail an inspection. It is noted that the defect threshold can be adjusted by the user and/or AI system. After receiving a defect data that exceeds a defect threshold, analysis component 214 can notify users of the defective product (based on defective ID number) along with other defective data (e.g., what areas failed inspection, which machines were used, what raw materials and expiration date, etc.) and a corrective action plan can be formulated.

Figure 3:
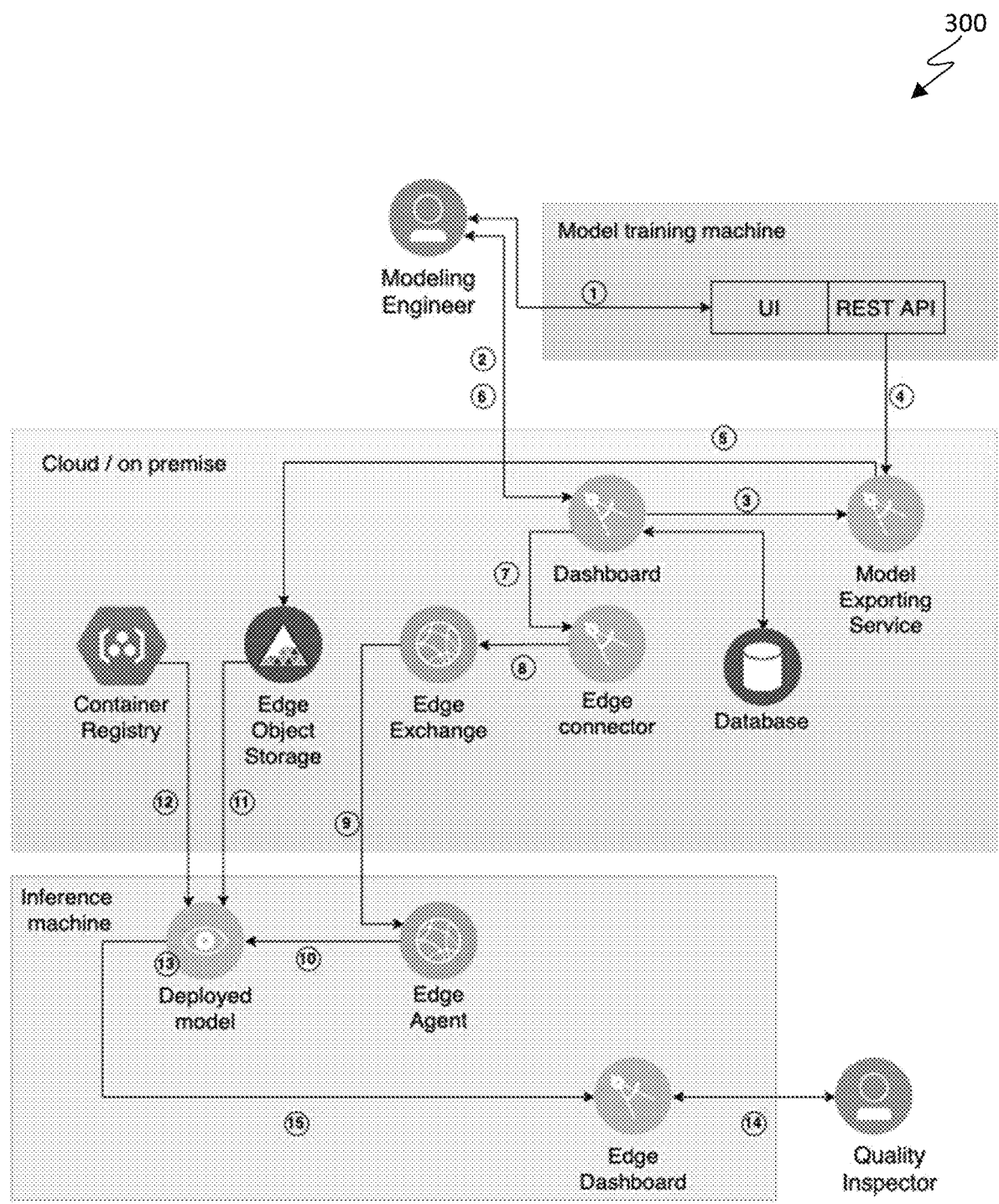
FIG. 3 is a diagram illustrating the components and steps of a current state of technology associated with a quality inspection in edge manufacturing, designated as 300, in accordance with an embodiment of the present invention.

FIG. 3 is a diagram illustrating the components and steps of a current state of technology associated with a quality inspection in edge manufacturing, in accordance with an embodiment of the present invention. The current state of defect identification involves the following steps: 1) Modeling engineer (ME) trains object detection model on a computer vision system, 2) Modeling engineer initiates a model exporting functionality in the main dashboard (after authorization process), 3) Dashboard invokes a model exporting service with storage specified as a cache for models, 4) Model exporting service communicates with REST API from the computer vision system to download the model, 5) Model exporting service stores model to the Edge object storage from model management service (MMS), 6) Modeling engineer initiates the model deployment to a specified edge nodes using main dashboard, 7) Main dashboard communicates with the Edge connector that is responsible for working with the EDGE Exchange API, 8) The Edge connector initializes deploying patterns using an Edge fabric Exchange API, 9) Edge fabric agent gets configuration from the Edge fabric Exchange to deploy a new container, 10) Edge fabric agent initiates a docker container, 11) Docker downloads the model content from the Edge Object storage, 12) Docker downloads requires the docker images as a runtime for model, 13) Docker starts model with the REST API, 14) Quality inspector uses Edge dashboard to analyze the photos of the product and 15) In the Edge dashboard, the photo is analyzed using REST API of the deployed model and the results are displayed.

Figure 4:
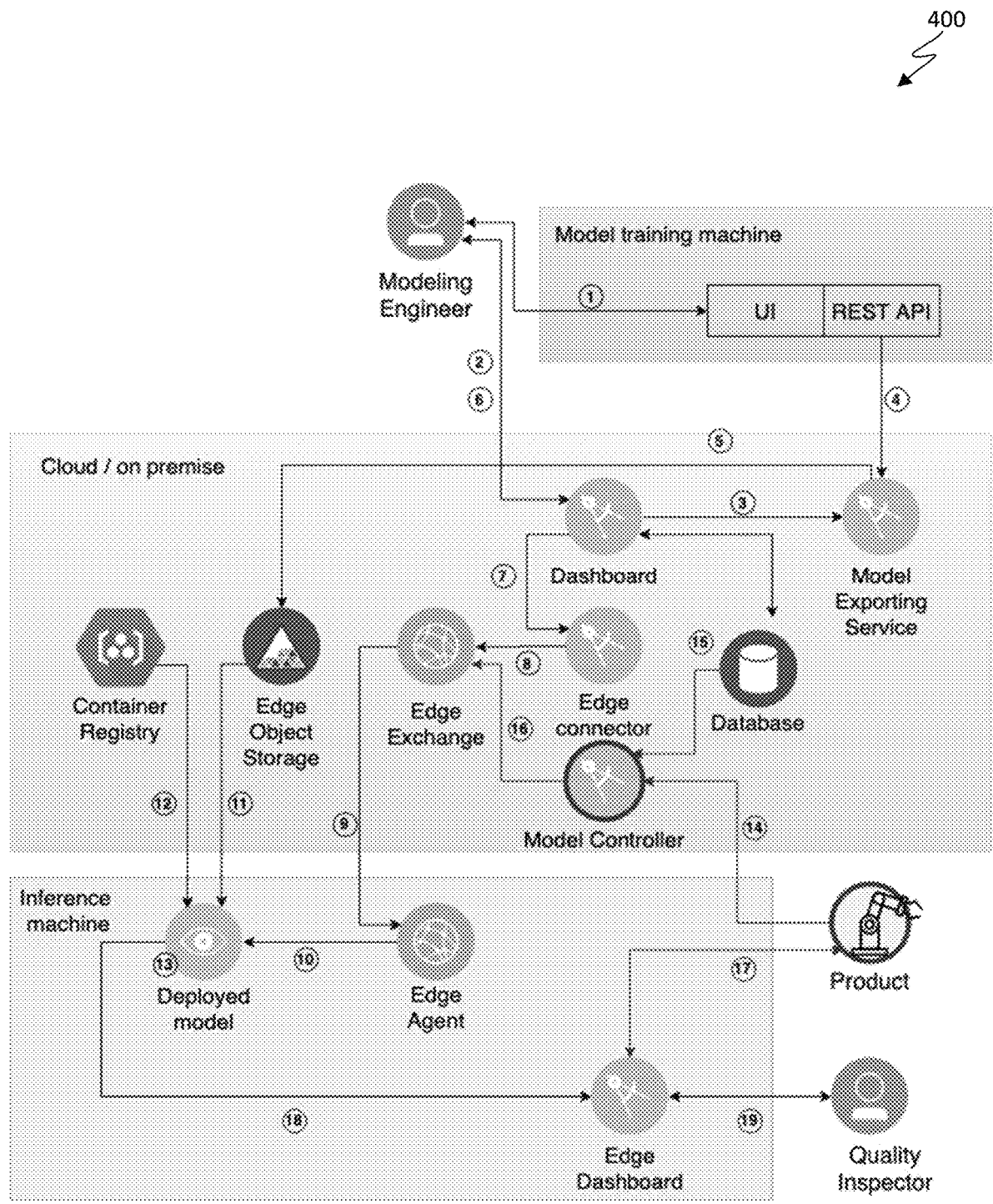
FIG. 4 is a diagram illustrating the added new components and new steps to FIG. 3 associated with a quality inspection in edge manufacturing, designated as 400, in accordance with an embodiment of the present invention.

FIG. 4 is a diagram illustrating new components and new steps added to FIG. 3 associated with a quality inspection in edge manufacturing, in accordance with an embodiment of the present invention. The following steps are added to FIG. 3: (14) Physical trigger initiates device inspection, (15) Model controller collects the meta data about the product to be inspected and selects the model with highest score (method of scoring was described in model data component 211) to find out defect(s), (16) Model controller checks if this model to be deployed is not in pause mode and initiates the model run, (17) Edge device invokes inspection, (18) Dashboard uses REST API of model to get results and if there is no defect then deploys the next model using model controller; repeat (16)-(18) and (19) If any defect was found then quality inspector receives alert and reviews results (i.e., the faulty product is sent to rework/repair).

Figure 5:
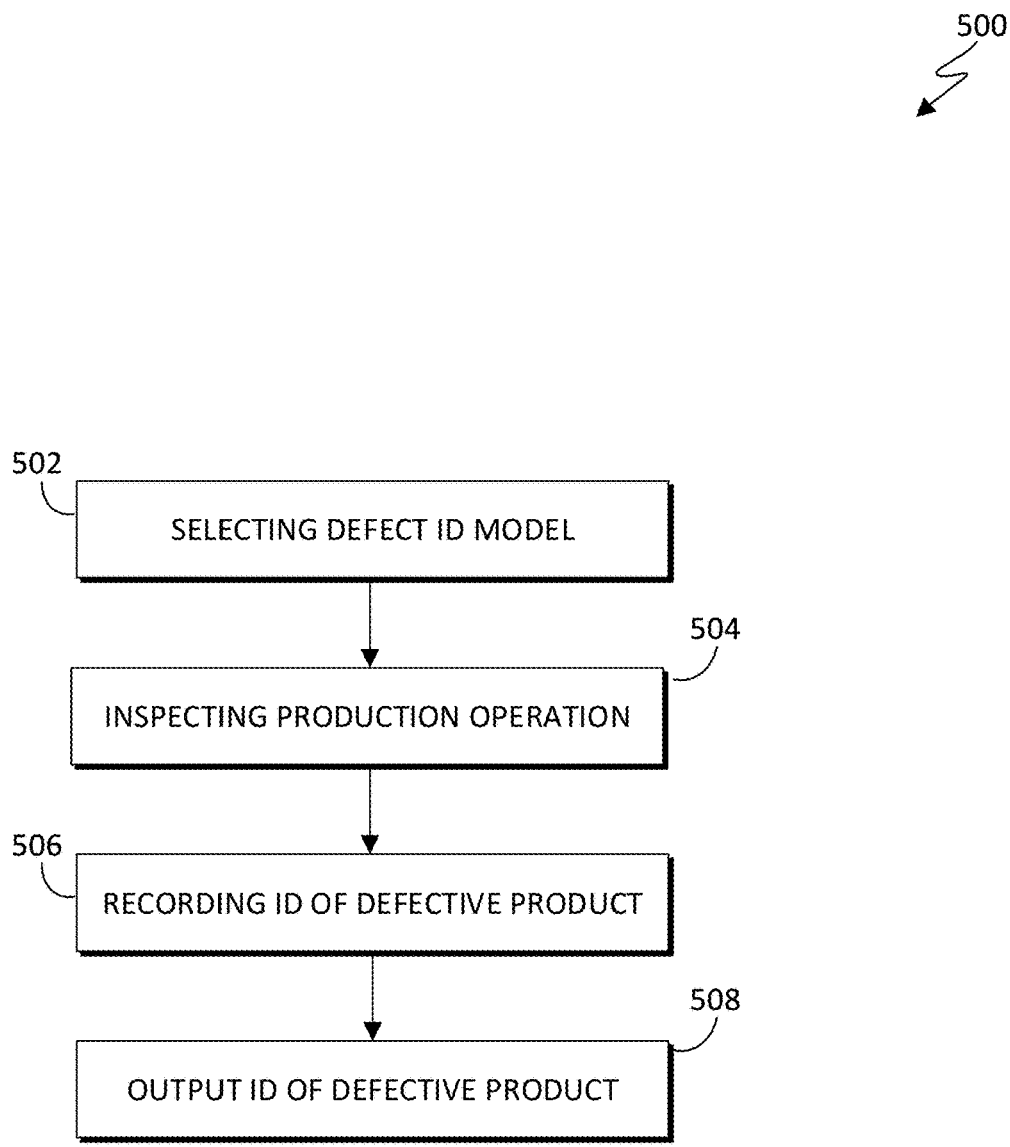
FIG. 5 is a high-level flowchart illustrating the operation of quality inspection component 111, designated as 500, in accordance with an embodiment of the present invention.

FIG. 5 is a flowchart illustrating the operation of quality inspection component 111, designated as 500, in accordance with an embodiment of the present invention.

Quality inspection component 111 selects a defect identification model (step 502). In an embodiment, quality inspection component 111, through model data component 211, selects the appropriate model for the product to be manufactured. Is it noted that model data component 211 has already performed the scoring of various models for each product before this step. Thus, (referring to Table 1), quality inspection component 111 can select defectModel_3 for product_A based on the highest scores against the other models (e.g., defectModel_1, defectModel_2, etc.).

Quality inspection component 111 inspects a product operation (step 504). In an embodiment, quality inspection component 111, through analysis component 214, initiates the product inspection. For example, analysis component 214 can instruct (via device controller component 213) a computer vision system to begin inspecting the product (i.e. product_A). Product_A has three areas for inspection. Only one area passed inspection (i.e., Product_A_point3) but the entire product is considered defective. It is noted that the defect threshold can be adjusted by the user and/or AI system.

Quality inspection component 111 record the identification of the defective product (step 506). In an embodiment, quality inspection component 111, through analysis component 214, has determined that a product (during inspection) has not passed the defect threshold and assigns a defect ID number to the defective product. For example, analysis component 214 assign a defect ID (identification) number (i.e., 082020201243XYZ) to product_A.

Quality inspection component 111 outputs the identification of the defective product (step 508). In an embodiment, quality inspection component 111, notifies users of the defective product (based on defective ID number) along with other defective data (e.g., what areas failed inspection, which machines were used, what raw materials and expiration date, etc.) and a corrective action plan can be formulated. For example, defective product_A is added to a list of defective products for the day's production run (i.e., defect daily log). The defect daily log can include a day and timestamp, failure area of the product and machines used. This defect daily log can be used by quality engineers and/or other by the employees to formulate a corrective action plan if the product defect rate exceeds a certain daily defect rate.

Figure 6:
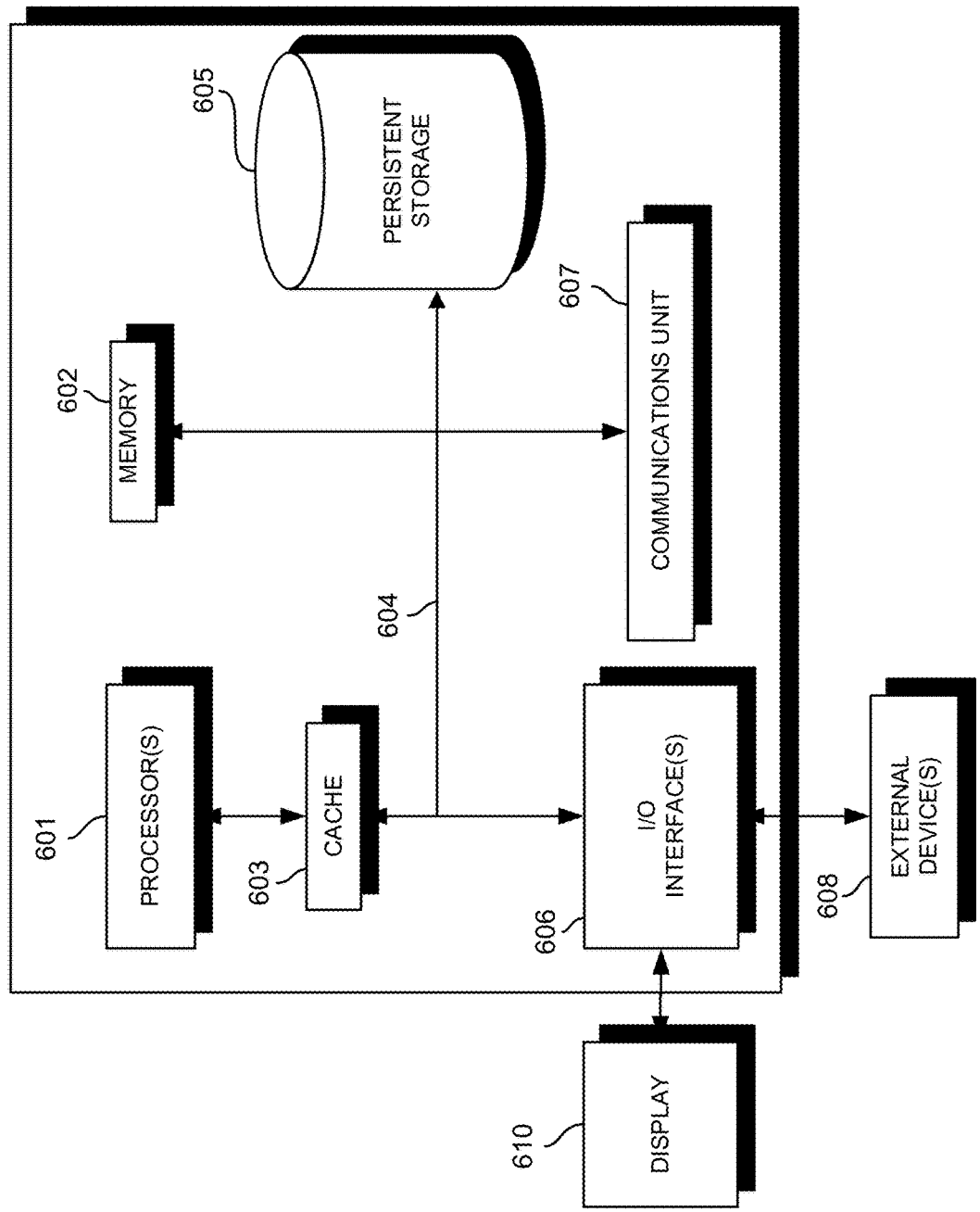
FIG. 6 depicts a block diagram, designated as 600, of components of a server computer capable of executing the quality inspection component 111 within the quality inspection environment, in accordance with an embodiment of the present invention.

FIG. 6, designated as 600, depicts a block diagram of components of quality inspection component 111 application, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

FIG. 6 includes processor(s) 601, cache 603, memory 602, persistent storage 605, communications unit 607, input/output (I/O) interface(s) 606, and communications fabric 604. Communications fabric 604 provides communications between cache 603, memory 602, persistent storage 605, communications unit 607, and input/output (I/O) interface(s) 606. Communications fabric 604 can be implemented with any architecture designed for passing data and/or control information between processors (such as microprocessors, communications and network processors, etc.), system memory, peripheral devices, and any other hardware components within a system. For example, communications fabric 604 can be implemented with one or more buses or a crossbar switch.

Memory 602 and persistent storage 605 are computer readable storage media. In this embodiment, memory 602 includes random access memory (RAM). In general, memory 602 can include any suitable volatile or non-volatile computer readable storage media. Cache 603 is a fast memory that enhances the performance of processor(s) 601 by holding recently accessed data, and data near recently accessed data, from memory 602.

Program instructions and data (e.g., software and data x10) used to practice embodiments of the present invention may be stored in persistent storage 605 and in memory 602 for execution by one or more of the respective processor(s) 601 via cache 603. In an embodiment, persistent storage 605 includes a magnetic hard disk drive. Alternatively, or in addition to a magnetic hard disk drive, persistent storage 605 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 605 may also be removable. For example, a removable hard drive may be used for persistent storage 605. Other examples include optical and magnetic disks, thumb drives, and smart cards that are inserted into a drive for transfer onto another computer readable storage medium that is also part of persistent storage 605. Quality inspection component 111 can be stored in persistent storage 605 for access and/or execution by one or more of the respective processor(s) 601 via cache 603.

Communications unit 607, in these examples, provides for communications with other data processing systems or devices. In these examples, communications unit 607 includes one or more network interface cards. Communications unit 607 may provide communications through the use of either or both physical and wireless communications links. Program instructions and data (e.g., Quality inspection component 111) used to practice embodiments of the present invention may be downloaded to persistent storage 605 through communications unit 607.

I/O interface(s) 606 allows for input and output of data with other devices that may be connected to each computer system. For example, I/O interface(s) 606 may provide a connection to external device(s) 608, such as a keyboard, a keypad, a touch screen, and/or some other suitable input device. External device(s) 608 can also include portable computer readable storage media, such as, for example, thumb drives, portable optical or magnetic disks, and memory cards. Program instructions and data (e.g., Quality inspection component 111) used to practice embodiments of the present invention can be stored on such portable computer readable storage media and can be loaded onto persistent storage 605 via I/O interface(s) 606. I/O interface(s) 606 also connect to display 610.

Display 610 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. I t will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for detecting, by one or more edge devices, defects in inspected products during quality inspection in a manufacturing environment, the computer-implemented method comprising:
   training, by the one or more edge devices, a machine learning model to detect the defects in the inspected products during manufacturing, wherein the training comprises selecting a defect identification model with a highest score based on a defect prioritizing algorithm, wherein the defect prioritizing algorithm further comprises of a model scoring equation:

$$score = \frac{\sum_{i=1}^{n} d_{tlb}}{n_{tlb}} * a + \left(\frac{\sum_{i=1}^{n} d_{tl}}{n_{tl}} + \frac{\sum_{i=1}^{n} d_{lb}}{n_{lb}} + \frac{\sum_{i=1}^{n} d_{tb}}{n_{tb}}\right) * b + \left(\frac{\sum_{i=1}^{n} d_{t}}{n_{t}} + \frac{\sum_{i=1}^{n} d_{l}}{n_{l}} + \frac{\sum_{i=1}^{n} d_{b}}{n_{b}}\right) * c,$$

where $d_{tlb}$ equals a number of defects in products with same product type, same manufacturing line and same batch, nub is a number of inspected products with same product type, same manufacturing line and same batch, $d_{tl}$ is a number of defects in products with same product type and same manufacturing line, nu is a number of inspected products with same product type and same manufacturing line, $d_{lb}$, is a number of defects in products with same manufacturing line and same batch, nib is a number of inspected products same manufacturing line and same batch, $d_{tb}$ is a number of defects in products with same product type and same batch, $n_{tb}$ is a number of inspected products with same product type and same batch, $d_t$ is a number of defects in products with same product type, $n_t$ is a number of inspected products with same product type, $d_l$ is a number of defects in products with same manufacturing line, $n_l$ is a number of inspected products with same manufacturing line, $d_b$ is a number of defects in products with same batch, $n_b$ is a number of inspected products with same batch and a, b, c are correlation coefficients where a>b>C;
   inspecting by the one or more edge devices, for the defects during a production operation based on the defect identification model;
   recording by the one or more edge devices, an identity of a defective product in the production operation; and
   outputting by the one or more edge devices, the identity of the defective product.

2. A computer-implemented method of claim 1, wherein selecting the defective identification model is chosen from a plurality of defective identification models based on a score of the plurality defective identification models that exceed a scoring threshold.

3. A computer-implemented method of claim 1, wherein recording the identity of the defective product further comprises: assigning a unique defective id (identification) number to the defective product.

4. A computer-implemented method of claim 3, wherein outputting the identity further comprises: generating a daily defect log based on the defective product which can include, but it is not limited to, the defective ID number, timestamp, machine number and raw materials.

5. A computer-implemented method of claim 1, wherein inspecting the production operation product further comprises: determining, by a computer vision system, one or more areas of a product exceed a defect threshold.

6. A computer-implemented method of claim 1, wherein the one or more edge devices further comprises a distributed edge cluster and a distributed AI quality inspection system.

7. A computer program product for detecting, by one or more edge devices, defects in inspected products during quality inspection in a manufacturing environment, the computer program product comprising one or more computer readable storage media having program instructions stored on the one or more computer readable storage media for execution by at least one of one or more computer processors to carry out the program instructions comprising:
   training a machine learning model to detect the defects in the inspected products during manufacturing, wherein the training comprises selecting a defect identification model with a highest score based on a defect prioritizing algorithm, wherein the defect prioritizing algorithm further comprises of a model scoring equation:

$$score = \frac{\sum_{i=1}^{n} d_{tlb}}{n_{tlb}} * a + \left(\frac{\sum_{i=1}^{n} d_{tl}}{n_{tl}} + \frac{\sum_{i=1}^{n} d_{lb}}{n_{lb}} + \frac{\sum_{i=1}^{n} d_{tb}}{n_{tb}}\right) * b + \left(\frac{\sum_{i=1}^{n} d_{t}}{n_{t}} + \frac{\sum_{i=1}^{n} d_{l}}{n_{l}} + \frac{\sum_{i=1}^{n} d_{b}}{n_{b}}\right) * c,$$

where dub equals a number of defects in products with same product type, same manufacturing line and same batch, $n_{tlb}$ is a number of inspected products with same product type, same manufacturing line and same batch, $d_{tl}$ is a number of defects in products with same product type and same manufacturing line, $n_{tl}$ is a number of inspected products with same product type and same manufacturing line, $d_{lb}$, is a number of defects in products with same manufacturing line and same batch, $n_{lb}$ is a number of inspected products same manufacturing line and same batch, $d_{tb}$ is a number of defects in products with same product type and same batch, $n_{tb}$ is a number of inspected products with same product type and same batch, $d_t$ is a number of defects in products with same product type, $n_t$ is a number of inspected products with same product type, $d_l$ is a number of defects in products with same manufacturing line, $n_l$ is a number of inspected products with same manufacturing line, $d_b$ is a number of defects in products with same batch, $n_b$ is a number of inspected products with same batch and a, b, c are correlation coefficients where a>b>C;
   inspecting for the defects during a production operation based on the defect identification model;
   recording an identity of a defective product in the production operation; and
   outputting the identity of the defective product.

8. The computer program product of claim 7, wherein selecting the defective identification model is chosen from a plurality of defective identification models based on a score of the plurality defective identification models that exceed a scoring threshold.

9. The computer program product of claim 7, wherein recording the identity of the defective product further comprises: program instructions to assign a unique defective id (identification) number to the defective product.

10. The computer program product of claim 9, outputting the identity further comprises: generating a daily defect log based on the defective product which can include, but it is not limited to, the defective ID number, timestamp, machine number and raw materials.

11. The computer program product of claim 7, wherein inspecting the production operation product further comprises: determining, by a computer vision system, one or more areas of a product exceed a defect threshold.

12. The computer program product of claim 7, wherein the one or more edge devices further comprises a distributed edge cluster and a distributed AI quality inspection system.

13. A computer system detecting, by one or more edge devices, defects in inspected products during quality inspection in a manufacturing environment, the computer system comprising:
one or more computer processors;
one or more computer readable storage media; and
program instructions stored on the one or more computer readable storage media for execution by at least one of the one or more computer processors to carry out the program instructions comprising:
training a machine learning model to detect the defects in the inspected products during manufacturing, wherein the training comprises selecting a defect identification model with a highest score based on a defect prioritizing algorithm, wherein the defect prioritizing algorithm further comprises of a model scoring equation:

$$score = \frac{\sum_{i=1}^{n} d_{tlb}}{n_{tlb}} * a + \left( \frac{\sum_{i=1}^{n} d_{tl}}{n_{tl}} + \frac{\sum_{i=1}^{n} d_{lb}}{n_{lb}} + \frac{\sum_{i=1}^{n} d_{tb}}{n_{tb}} \right) * b + \left( \frac{\sum_{i=1}^{n} d_{t}}{n_{t}} + \frac{\sum_{i=1}^{n} d_{l}}{n_{l}} + \frac{\sum_{i=1}^{n} d_{b}}{n_{b}} \right) * c,$$

where $d_{tlb}$ equals a number of defects in products with same product type, same manufacturing line and same batch, $n_{tlb}$ is a number of inspected products with same product type, same manufacturing line and same batch, $d_{tl}$ is a number of defects in products with same product type and same manufacturing line, $n_{tl}$ is a number of inspected products with same product type and same manufacturing line, $d_{lb}$ is a number of defects in products with same manufacturing line and same batch, $n_{lb}$ is a number of inspected products same manufacturing line and same batch, $d_{tb}$ is a number of defects in products with same product type and same batch, $n_{tb}$ is a number of inspected products with same product type and same batch, $d_t$ is
a number of defects in products with same product type, $n_t$ is
a number of inspected products with same product type, $d_l$ is
a number of defects in products with same manufacturing line, $n_l$
is a number of inspected products with same manufacturing line, $d_b$ is a number of defects in products with same batch, $n_b$ is a number of inspected products with same batch and a, b, c are correlation coefficients where a>b>C;
inspecting for the defects during a production operation based on the defect identification model;
recording an identity of a defective product in the production operation; and
outputting the identity of the defective product.

14. The computer system of claim 13, wherein selecting the defective identification model is chosen from a plurality of defective identification models based on a score of the plurality defective identification models that exceed a scoring threshold.

15. The computer system of claim 13, wherein recording the identity of the defective product further comprises: program instructions to assign a unique defective id (identification) number to the defective product.

16. The computer system of claim 15, outputting the identity further comprises: generating a daily defect log based on the defective product which can include, but it is not limited to, the defective ID number, timestamp, machine number and raw materials.

17. The computer system of claim 13, wherein inspecting the production operation product further comprises: determining, by a computer vision system, one or more areas of a product exceed a defect threshold.

* * * * *